United States Patent
Ramachandran et al.

(10) Patent No.: US 12,549,255 B2
(45) Date of Patent: *Feb. 10, 2026

(54) USER CONFIGURABLE SPECTRAL LOADING IN AN OPTICAL LINE SYSTEM, USING POLICIES AND PARAMETERS

(71) Applicant: Infinera Corp., San Jose, CA (US)

(72) Inventors: Sanjeev Ramachandran, San Jose, CA (US); Ashok Kunjidhapatham, Devarachikkanahalli (IN); Jonathan Buset, San Jose, CA (US)

(73) Assignee: Infinera Corp.

( * ) Notice: Subject to any disclaimer, the term of this patent is extended or adjusted under 35 U.S.C. 154(b) by 249 days.

This patent is subject to a terminal disclaimer.

(21) Appl. No.: 18/146,654

(22) Filed: Dec. 27, 2022

(65) Prior Publication Data

US 2023/0224039 A1    Jul. 13, 2023

Related U.S. Application Data

(60) Provisional application No. 63/298,187, filed on Jan. 10, 2022.

(51) Int. Cl.
*H04B 10/25* (2013.01)
*H04Q 11/00* (2006.01)

(52) U.S. Cl.
CPC ......... *H04B 10/25* (2013.01); *H04Q 11/0062* (2013.01); *H04Q 2011/0081* (2013.01)

(58) Field of Classification Search
CPC ................ H04B 10/25; H04B 10/2589; H04B 10/25891; H04B 10/27; H04Q 11/0062; H04Q 2011/0081; H04Q 2011/0083; H04Q 2011/0084; H04Q 2011/0086; H04Q 2011/0088; H04J 14/021
See application file for complete search history.

(56) References Cited

U.S. PATENT DOCUMENTS

| | | | |
|---|---|---|---|
| 2020/0153502 A1* | 5/2020 | Buset | H04B 10/0777 |
| 2020/0153533 A1* | 5/2020 | Yilmaz | H04J 14/02216 |
| 2022/0277108 A1* | 9/2022 | Peng | G06F 21/6218 |

(Continued)

FOREIGN PATENT DOCUMENTS

WO    WO-2021036706 A1 *  3/2021  ......... G06F 9/44521

*Primary Examiner* — Hibret A Woldekidan

(57) ABSTRACT

Disclosed herein are methods and systems for generating and/or obtaining at least one loading policy for a transmission line segment that is currently operating, the at least one loading policy comprising a combination of loading parameters for one or more types of loading management operations associated with the transmission line segment. At least one of the loading policies may be activated on a network element of the transmission line segment. Upon receiving a loading request to change a spectral loading pattern of the transmission line segment, current loading data of the transmission line segment and loading parameters from the activated loading policy may be obtained and used to generate a loading response. A signal containing the loading response may be sent to the network element, the signal configured to cause the network element to change the spectral loading pattern of the transmission line segment based on the loading response.

20 Claims, 5 Drawing Sheets

(56) References Cited

U.S. PATENT DOCUMENTS

| | | | |
|---|---|---|---|
| 2023/0327762 A1* | 10/2023 | Buset | H04J 14/0261 398/147 |
| 2023/0327794 A1* | 10/2023 | Buset | H04J 14/021 398/45 |

* cited by examiner

USER CONFIGURABLE SPECTRAL LOADING IN AN OPTICAL LINE SYSTEM, USING POLICIES AND PARAMETERS

CROSS REFERENCE TO RELATED APPLICATION

This application claims the benefit of U.S. Provisional Patent Application No. 63/298,187, which was filed on Jan. 10, 2022, the contents of which are incorporated herein by reference in their entirety.

BACKGROUND

In an optical communication system capable of transporting data on multiple bands such as a C-Band and an L-Band, loading changes impact spectrum tilt and a power of existing passbands. To ensure that existing passbands, and newly added ones, do not suffer transients, guidelines have been developed by network providers that guide network operators. The guidelines may be provided in the form of documentation, pre-programmed in system software, or reviewed using a presentation layer of the system software.

Loading changes in an optical link are determined using multiple parameters that might differ from one optical link to another. When making loading changes, an operator of the optical link may opt to be aggressive or conservative in deciding how much power may be changed in a given loading cycle. Because of the number and complexity of the loading parameters, allowing the operator of the optical link to configure the parameters in the presentation layer of the system software is prone to user error and exposes the optical link to failure. To avoid these problems, some systems use software having pre-programmed parameters that control the optical link. However, this solution requires a new release of the system software any time changes are made to the optical link or for any new optical links that have a new combination of parameter values.

SUMMARY

The methods and systems disclosed herein solve these problems by providing a loading management system that provides an automated framework that allows the network operator to dynamically create, install, and activate loading policies that may be used to configure spectral loading of a transmission line segment to obtain a desired loading pattern.

In one aspect, in accordance with some implementations, the specification describes methods and systems including a system, comprising: a network element having a processor and a non-transitory computer readable memory storing instructions that, when executed by the processor, cause the network element to: obtain and store at least one loading policy for a transmission line segment that is currently operating, the at least one loading policy comprising a combination of loading parameters for one or more types of loading management operations associated with the transmission line segment; activate at least one of the at least one loading policy; receive a loading request to change a spectral loading pattern of the transmission line segment; obtain current loading data of the transmission line segment; obtain loading parameters from the at least one of the at least one loading policy that was activated; generate a loading response based at least in part on the current loading data and the loading parameters from the at least one of the at least one loading policy that was activated; and send a signal containing the loading response, the signal configured to change the spectral loading pattern of the transmission line segment based on the loading response.

In one aspect, the loading parameters comprise one or more of a region in an optical spectrum where the spectral loading pattern of the transmission line segment is to be changed; a maximum power change allowed due to loading; a loading factor for a given range of current loading; an allowable loading limit for a given range of current loading; whether to consider loading criteria; topology of the transmission line segment; and load balancing.

In another aspect, the one or more types of loading management operations comprise service activation, service deactivation, band activation, band deactivation, segment activation, and segment deactivation.

In yet another aspect the at least one loading policy for the transmission line segment is generated using a user device.

In yet another aspect, the at least one loading policy for the transmission line segment is obtained from the user device, the user device connected to the network element via a network.

In yet another aspect, a first signal containing a command to activate the at least one of the at least one loading policy was sent from the user device to the network element via the network, the signal causing the network element to activate the at least one of the at least one loading policy.

In yet a further aspect, a second signal containing the loading request to change the spectral loading pattern of the transmission line segment was sent from the user device to the network element via the network.

In yet a further aspect, the current loading data of the transmission line segment includes characteristics of the transmission line segment including at least one of a type of amplifier, a fiber type, offsets that are being configured, and number of spans.

In yet another aspect, the network element is an optical node.

In yet another aspect, the network element is a network administration device and the signal containing the loading response is sent to an optical node of the transmission line segment, the signal configured to cause the optical node to change the spectral loading pattern of the optical network segment based on the loading response.

In one aspect, in accordance with some implementations, the specification describes a method for configuring a spectral loading pattern, comprising: obtaining at least one loading policy for a transmission line segment that is currently operating, the at least one loading policy comprising a combination of loading parameters for one or more types of loading management operations associated with the transmission line segment; activating, at a network element of the transmission line segment, at least one of the at least one loading policy; receiving a loading request to change a spectral loading pattern of the transmission line segment; obtaining current loading data of the transmission line segment; obtaining loading parameters from the at least one of the at least one loading policy that was activated; generating a loading response based at least in part on the current loading data and the loading parameters from the at least one of the at least one loading policy that was activated; and sending a signal containing the loading response to the network element of the transmission line segment, the signal configured to cause the network element to change the spectral loading pattern of the transmission line segment based on the loading response.

In one aspect of the exemplary method, the loading parameters comprise one or more of a region in an optical spectrum where the spectral loading pattern of the transmission line segment is to be changed; a maximum power change allowed due to loading; a loading factor for a given range of current loading; an allowable loading limit for a given range of current loading; whether to consider loading criteria; topology of the transmission line segment; and load balancing.

In another aspect of the exemplary method, the one or more types of loading management operations comprise service activation, service deactivation, band activation, band deactivation, segment activation, and segment deactivation.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
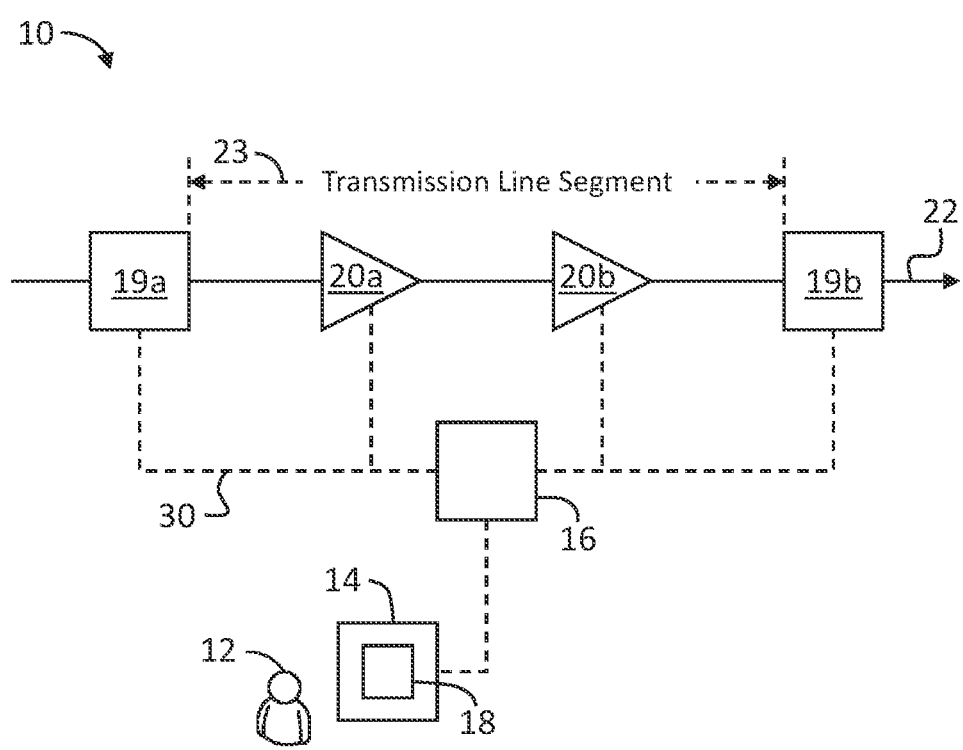
FIG. 1 is a diagrammatic view of hardware forming an exemplary optical network having a loading management system designed to dynamically, create, install, and activate loading policies that may be used to configure spectral loading in the optical network constructed in accordance with one embodiment of the present disclosure.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light path. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may carry an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may carry a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node.

Amplified spontaneous emission (ASE) is light produced by spontaneous emission that has been optically amplified by the process of stimulated emission in a gain medium. ASE is light that is incoherent and causes perturbations on the optical link. Every optical amplifier, e.g., EDFAs and Raman amplifiers, emit ASE. If an amplified spontaneous emission power level is too high relative to the transmission signal power level, the transmission signal in the fiber optic cable will be unreadable due to a low signal to noise ratio.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a reconfigurable add-drop multiplexer (ROADM) node refers to an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar light wave circuit (PLC), and wavelength selective switching (WSS)—though the WSS has become the dominant technology. A ROADM system is a metro/regional wavelength division multiplexing (WDM) or long-haul dense wavelength division multiplexing (DWDM) system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

FIG. 1 is a diagrammatic view of hardware forming an exemplary system 10 designed to allow a user to dynamically create, install, and activate loading policies that may be used to configure spectral loading in the transmission line segment 23 of an optical network 22 constructed in accordance with one embodiment of the present disclosure. A user 12 may interact with the system 10 using a user device 14 that may be used to request, from a network administration device 16, a graphical user interface 18 (hereinafter "GUI 18") configured to accept input from the user 12 that may be transmitted to the network administration device 16 and/or one or more optical node 19 such as optical node 19a and/or optical node 19b of the optical network 22.

The network administration device 16 may be connected to the optical nodes 19a and 19b in the optical network 22 and the user device 14 via a network 30. In some embodiments, the network 30 may be the Internet and/or other network. For example, if the network 30 is the Internet, the GUI 18 of the system 10 may be delivered through a series of web pages or private internal web pages of a company or corporation, which may be written in hypertext markup language. It should be noted that the GUI 18 of the system 10 may be another type of interface including, but not limited to, a Windows-based application, a tablet-based application, a mobile web interface, an application running on a mobile device, and/or the like.

The network 30 may be almost any type of network. For example, in some embodiments, the network 30 may be a version of an Internet network (e.g., exist in a TCP/IP-based network). It is conceivable that in the near future, embodiments within the present disclosure may use more advanced networking technologies.

Optical network 22 may include any type of network that uses light as a transmission medium. For example, optical network 22 may include a wavelength division multiplexed optical communication system, a fiber-optic based network, an optical transport network, a laser diode network, an infrared network, and/or a combination of these or other types of optical networks. The optical network may be provided with one or more optical amplifier 20 such as optical amplifier 20a and optical amplifier 20b.

The one or more optical nodes 19 may be a reconfigurable add-drop multiplexer (ROADM) node. The transmission line segment 23 connects optical nodes 19 and optical amplifiers 20 in the optical network 22. The network administration device 16 may also be connected to and communicate with the optical amplifiers 20a and 20b.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination of wired and wireless connections.

Figure 2:
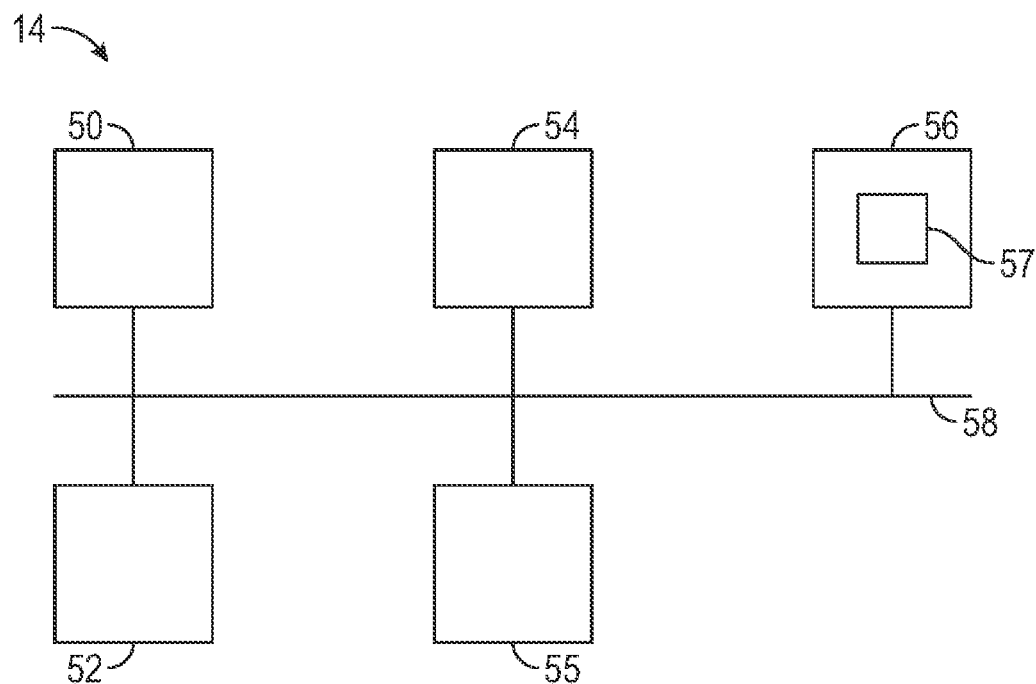
FIG. 2 is a diagrammatic view of an exemplary user device for use in the loading management system designed to dynamically, create, install, and activate loading policies that may be used to configure spectral loading in the optical network illustrated in FIG. 1.

As shown in FIG. 2, the one or more user devices 14 of the system 10 may include, but are not limited to implementation as a personal computer, a cellular telephone, a smart phone, a network-capable television set, a tablet, a laptop computer, a desktop computer, a network-capable handheld device, a server, a digital video recorder, a wearable network-capable device, and/or the like.

In some embodiments, the user device 14 may include one or more input devices 50 (hereinafter "input device 50"), one or more output devices 52 (hereinafter "output device 52"), one or more processors 54 (hereinafter "processor 54"), one or more communication devices 55 (hereinafter "communication device 55") capable of interfacing with the network 30, one or more non-transitory memory 56 (hereinafter "memory 56") storing processor executable code and/or software application(s), for example including, a web browser capable of accessing a website and/or communicating information and/or data over a wireless or wired network (e.g., network 30), and/or the like. The input device 50, output device 52, processor 54, communication device 55, and memory 56 may be connected via a path 58 such as a data bus that permits communication among the components of user device 14.

The memory 56 may store an application 57 that, when executed by the processor 54 causes the user device 14 to display the GUI 18. In some embodiments, the application 57 is programmed to cause the processor 54 to provide the GUI 18 that allows the user 12 to interact with both historical and real-time information gathered from the network elements 20 as will be described further herein. The input device 50 may be capable of receiving information input from the user 12 and/or processor 54, and transmitting such information to other components of the user device 14 and/or the network 30. For instance, the user 12 may input a loading request in the GUI 18 and the user device 14 may transmit the loading request to the network administration device 16 and/or the optical node 19 over the network 30.

In some embodiments, the GUI 18 may be configured to accept and/or guide input from the user 12 to generate, install, and/or edit a loading policy. A loading policy, as used herein, refers to a combination of operational and/or loading parameters for different types of loading management operations that enable a user to change a spectral loading pattern, for a given set of characteristics and current loading of an optical line segment, in an operational transmission line segment such as transmission line segment 23 without making changes to existing system software. Exemplary loading management operations include, but are not limited to, service activation (activation of a particular channel in a band), service deactivation (deactivation of a particular channel in a band), band activation (activation of a complete band), band deactivation (deactivation of a complete band), segment activation (activation of both C and L bands at the same time), and segment deactivation (deactivation of both C and L bands at the same time). Loading policies may be specifically directed to one loading management operation (e.g., service activation only), directed to different types of loading management operations (e.g., service activation and deactivation), or globally directed to cover all loading management operations (e.g., system default static loading policies). As further described herein, for every loading management operation, there may be an associated loading policy.

Loading parameters are parameters that influence a loading pattern in a transmission line segment and may be a combination of attributes. Exemplary loading parameters include, but are not limited to: region in a spectrum where requested loading is to take place; maximum power change allowed due to loading; loading factor for a given range of current loading; allowable loading limit for a given range of current loading; whether to consider loading criteria (e.g., minimum loading criteria); topology of the line segment (e.g., types of amplifiers, number of amplifiers, type of fiber, C band, L band, or C+L band, offsets that are being configured, number of network spans, etc.); and load balancing. Loading policies drive loading patterns. The loading pattern may be dynamically derived depending on the loading policy and current system conditions.

In an example loading policy configured for service activation, if one band (C band will be used for the purposes of illustration) is loaded and the user submits a loading request to load channels in the L band, Raman tilt may be created. Raman tilt is defined (in dB) as the difference between the power (in dB) of the longest wavelength channel and the power (in dB) of the shortest wavelength channel in the already loaded spectrum. The Raman tilt, or effect, becomes particularly pronounced when an appreciable level of optical power distributed over a certain range of wavelengths is pumped into an optical fiber. In that instance, the Raman gain is tilted in favor of the channels having the longer wavelengths. The Raman effect attenuates the power levels of the optical channels of the lower wavelengths, but increases the power levels of the optical channels of the higher wavelengths by shifting the power from the former channels to the latter channels. The Raman tilt thus degrades the Signal-to-Noise Ratio (SNR) of the signals in the lower wavelength channels and thus seriously degrades performance of the lower wavelength channels. To counter Raman tilt, the exemplary loading policy for service activation may recommend an order in which to load the new channels on the L band based on the current loading of the C band spectrum, the region of the L band into which the new channels are to be loaded, and/or the power of the wavelengths of the channels to be loaded, for instance.

In another example, a loading policy for segment activation may be created for a loading request instance where neither the C band nor the L band is loaded and channels of both the C band and L band are requested to be loaded. In this exemplary situation, Raman tilt is not a concern because there is no loaded spectrum so the exemplary loading policy for segment activation may recommend allowing all requested channels on both the C band and the L band to be loaded all at once.

In another example, a loading policy may be created that takes into account how full a band currently is. For instance, if a band is between one percent (1%) and twenty five percent (25%) full, use loading rate A, if the band is between twenty six percent (26%) and fifty percent (50%) full, use loading rate B, if the band is between fifty one percent (51%) and seventy five percent (75%) full, use loading rate C, and if the band is between seventy six percent (76%) and one hundred percent (100%) full, use loading rate D.

It should be noted that the preceding loading policies were provided for the purposes of illustration only and should not be considered a complete list of possible loading policies. A person of skill in the art will appreciate that any number of loading policies may be dynamically created and/or edited that allow the user to change a spectral loading pattern, for a given set of parameters impacting a transmission line segment, while the transmission line segment is operational and without changes to existing system software.

The input device 50 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 52 may be capable of outputting information in a form perceivable by the user 12 and/or processor 54. For example, implementations of the output device 52 may include, but are not limited to, a computer monitor, a screen, a touchscreen, a speaker, a web site, a television set, a smart phone, a PDA, a cell phone, a fax machine, a printer, a laptop computer, combinations thereof, and the like, for example. It is to be understood that in some exemplary embodiments, the input device 50 and the output device 52 may be implemented as a single device, such as, for example, a touchscreen of a computer, a tablet, or a smartphone. It is to be further understood that as used herein the term user 12 is not limited to a human being, and may comprise, a computer, a server, a website, a processor, a network interface, a human, a user terminal, a virtual computer, combinations thereof, and/or the like, for example.

The network administration device 16 may be capable of interfacing and/or communicating with the user device 14 via the network 30. For example, the network administration device 16 may be configured to interface by exchanging signals (e.g., analog, digital, optical, and/or the like) via one or more ports (e.g., physical ports or virtual ports) using a network protocol, for example. Additionally, each network administration device 16 may be configured to interface and/or communicate with other network administration device 16 directly and/or via the network 30, such as by exchanging signals (e.g., analog, digital, optical, and/or the like) via one or more ports.

The network 30 may permit bi-directional communication of information and/or data between the network administration device 16, the user device 14, the optical nodes 19, and/or the optical amplifiers 20. The network 30 may interface with the network administration device 16, the user device 14, the optical nodes 19, and/or the optical amplifiers 20 in a variety of ways. For example, in some embodiments, the network 30 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 30 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and the like, for example. Additionally, the network 30 may use a variety of network protocols to permit bi-directional interface and/or communication of data and/or information between the network administration device 16, the user device 14, the optical nodes 19, and/or the optical amplifiers 20.

Figure 3:
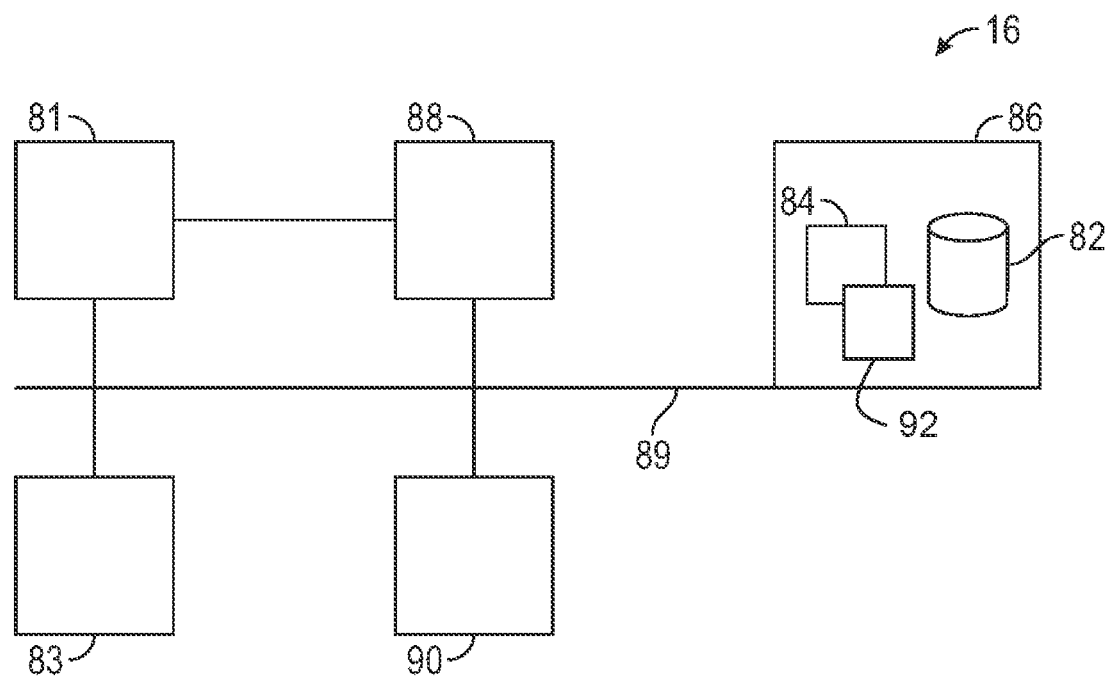
FIG. 3 is a diagrammatic view of an exemplary embodiment of a network administration device for use in the loading management system designed to dynamically, create, install, and activate loading policies that may be used to configure spectral loading in the optical network illustrated in FIG. 1.
Figure 4:
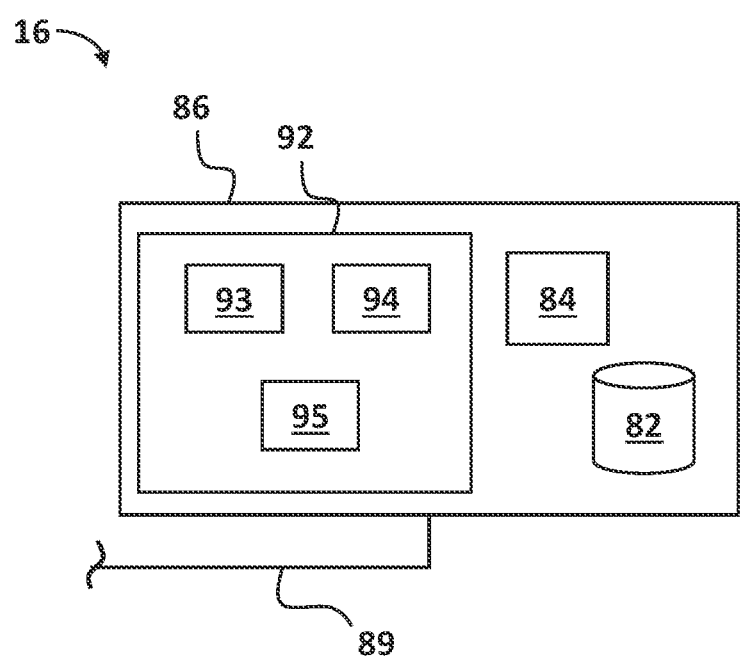
FIG. 4 is a diagrammatic view of an exemplary loading management module configured to operate on the network administration device of FIG. 3 in accordance with one embodiment of the present disclosure.

Referring now to FIGS. 3 and 4, shown therein are diagrammatic views of an exemplary embodiment of the network administration device 16. The network administration device 16 may include one or more devices that gather, process, search, store, and/or provide information in a manner described herein. In the illustrated embodiment, the network administration device 16 is provided with an input device 81 one or more databases 82 (hereinafter "database 82"), program logic 84, and one or more processors 88 (hereinafter "processor 88"). The program logic 84, the database 82, and a loading management module 92 may be stored on non-transitory computer readable storage memory 86 (hereinafter "memory 86") accessible by the processor 88 of the network administration device 16. It should be noted that as used herein, program logic is another term for instructions which can be executed by the processor 54 or the processor 88. The loading management module 92 may be program logic.

The database 82 can be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 82 can be centralized or distributed across multiple systems.

In some embodiments, the network administration device 16 may comprise one or more processors 88 working together, or independently to, execute processor executable code stored on the memory 86. Additionally, each network administration device 16 may include at least one input device 81 (hereinafter "input device 81") and at least one output device 83 (hereinafter "output device 83"). Each element of the network administration device 16 may be partially or completely network-based or cloud-based, and may or may not be located in a single physical location.

The processor 88 may be implemented as a single processor or multiple processors working together, or independently, to execute the program logic 84 as described herein. It is to be understood, that in certain embodiments using more than one processor 88, the processors 88 may be located remotely from one another, located in the same location, or comprising a unitary multi-core processor. The processors 88 may be capable of reading and/or executing processor executable code and/or capable of creating, manipulating, retrieving, altering, and/or storing data structures into the memory 86.

Exemplary embodiments of the processor 88 may include, but are not limited to, a digital signal processor (DSP), a central processing unit (CPU), a field programmable gate array (FPGA), a graphics processing unit (GPU), a microprocessor, a multi-core processor, combinations, thereof, and/or the like, for example. The processor 88 may be capable of communicating with the memory 86, the input device 81, the output device 83, and/or the communication device 90 via a path 89 (e.g., data bus).

The processor 88 may be further capable of interfacing and/or communicating with the user device 14 and/or the optical node 19 or the optical amplifier 20 via the network 30 using the communication device 90. For example, the processor 88 may be capable of communicating via the network 30 by exchanging signals (e.g., analog, digital, optical, and/or the like) via one or more ports (e.g., physical or virtual ports) using a network protocol to provide a pump model to the optical amplifier 20 as will be described in further detail herein.

The memory 86 may be capable of storing processor executable code such as program logic 84. Additionally, the memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the network administration device 16, and/or one or more memory 86 may be located remotely from the network administration device 16. For example, the memory 86 may be located remotely from the network administration device 16 and communicate with the processor 88 via the network 30. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer readable storage memory (i.e., one or more memory 86 may be partially or completely based on or accessed using the network 30).

The input device 81 of the network administration device 16 may transmit data to the processor 88 and may be similar to the input device 50 of the user device 14. The input device 81 may be located in the same physical location as the processor 88, or located remotely and/or partially or completely network-based. The output device 83 of the network administration device 16 may transmit information from the processor 88 to the user 12, and may be similar to the output device 52 of the user device 14. The output device 83 may be located with the processor 88, or located remotely and/or partially or completely network-based.

The memory 86 may store processor executable code and/or information comprising the database 82, program logic 84, and the loading management module 160. In some embodiments, the processor executable code 84 may be stored as a data structure, such as the database 82 and/or data table, for example, or in non-data structure format such as in a non-compiled text file.

Referring to FIG. 4, the loading management module 92 may be used to dynamically create, install, and/or activate loading policies that may be used to configure spectral loading in the transmission line segments 23 of the optical network 22 and to perform tasks as will be described in further detail herein.

The loading management module 92 may be provided with a policy loader module 93, an activated policy module 94, and a spectrum loading module 95.

The policy loader module 93 may be configured to accept and store loading policies. The loading policies may be default system loading policies that are automatically installed when the loading management module 92 is installed, for instance, or loading policies may be generated and/or edited using the user device 14 and/or the network management device 16 and uploaded or installed over the network 30, for instance. The loading policies may be edited, installed, and/or created using a management interface such as GUI 18 described above. Loading policies may be created by a network operator (e.g., user 12) or a third party such as a distributor or manufacturer of one or more elements of the network 22 such as optical node 19 or optical amplifier 20, for instance. Loading policies that are created by third parties may be distributed and installed in the policy loader module 93 using any suitable methodology.

The policy loader module 93 may contain any number of loading policies that may be activated when needed based on the characteristics and current loading of the transmission line segment 23, for instance. In other words, the policy loader module 93 may contain loading policies that are not currently being used but may be activated for use by the network operator to accommodate for changes in the transmission line segment 23, for instance.

The activated policy module 94 may be configured to contain loading policies that have been activated based on characteristics and current loading of a given transmission line segment such as transmission line segment 23. In an exemplary operation of the system 10, the user 12 may use the GUI 18 to review loading policies contained in the policy loader module 93 and activate one or more desired loading policy. Upon activation, the loading management module 92 may be configured to fetch or move the activated loading policy from the policy loader module 93 to the activated policy module 94 and initialize loading parameters associated with the activated loading policy to be used when the user 12 initiates a loading request.

Every release or version of the loading management module 92 may include system loading policies that may be referred to as static loading policies. These static loading policies address loading parameters based on a typical transmission line segment of a customer or network operator. The static loading policies may be based on loading parameters collected from simulations using a gaussian noise (GN) simulator, interpolation, data collected in the field, and lab testing, for instance. Generally, the loading management module 92 is provided with a static loading policy for aggressive power change during channel loading and a static loading policy for conservative power change during channel loading.

In an exemplary use of the system 10, after release of the loading management module 92, operating conditions and/or make up of the network 22 may change. To account for these changes, the user 12 (e.g., network operator) may change the spectral loading pattern to achieve a desired loading behavior by selecting a loading policy from the policy loader module 93, creating a new loading policy, or editing an existing loading policy. To differentiate from the static loading policies, loading policies that may be selected, created, and/or edited depending on the characteristics and the current loading of the transmission line segment 23 may be referred to as dynamic loading policies. These dynamic loading policies allow the user 12 to change the spectral loading pattern to achieve the desired loading behavior while the transmission line segment 23 is operational.

In some embodiments, dynamic loading policies that were created or edited during operation of the transmission line segment 23 during one release of the system software may be packaged as static loading policies that are automatically loaded with a new release of the system software.

It should be noted that while the exemplary loading policies discussed above may be characterized as being primarily directed to one loading parameter, loading policies may be created that are directed to multiple loading parameters of the transmission line segment and/or a loading management module 92 may be configured to use a collection of loading policies (i.e., a combination of more than one loading policy) to account for all loading parameters that may influence a loading pattern in the transmission line segment 23. For example, some fiber types are not recommended for aggressive loading. Therefore, if a loading request is received for transmission line segment 23 activation of channels on both the C and L bands for a transmission line segment 23, but the transmission line segment 23 includes a fiber type not recommended for aggressive loading, the exemplary loading policy for segment activation that recommended allowing all requested channels on both the C band and the L band to be loaded all at once, by itself, would be too aggressive for the topology of the transmission line segment 23. In that situation, the loading management module 92 may be configured to use a combination of loading policies to generate a loading response with more conservative loading.

The spectrum loading module 95 may be configured to obtain current loading data comprising a current spectral loading of the network 22 and/or loading of transmission line segment 23. For instance, the spectrum loading module 95 may be provided with instructions that cause the processor 88 to send a signal over the network 30 to the optical nodes 19a and 19b to obtain the current loading data. In an exemplary embodiment, the spectrum loading module 95 may be configured to obtain the current loading data substantially in real time when the user 12 submits a loading request. In other words, when the user 12 submits the loading request, the spectrum loading module 95 may be programmed to automatically obtain the current loading data for the transmission line segment 23, for instance, from the optical nodes 19a and 19b. In another exemplary embodiment, the spectrum loading module 95 may be configured to obtain the current loading data at predetermined intervals of time and store the current loading data in the memory 86 associated with the transmission line segment 23, for instance. The loading management module 92 may use the current loading data, activated loading policies, and the loading request submitted by the user to generate a loading response comprising a list of passbands to load as will be explained further herein.

Optical nodes 19a and 19b may include one or more devices that gather, process, store, and/or provide information in a manner described herein. For example, the optical nodes 19a and 19b may include one or more optical data processing and/or traffic transfer devices, such as an optical add-drop multiplexer ("OADM"), a reconfigurable optical add-drop multiplexer ("ROADM"), or a flexibly reconfigurable optical add-drop multiplexer module ("FRM") and/or any type of device capable of processing and/or transferring optical traffic.

In some implementations, optical nodes 19a and/or 19b may include OADMs and/or ROADMs capable of being configured to add, drop, multiplex, and demultiplex optical signals. Optical nodes 19a and/or 19b may process and transmit optical signals to other optical nodes 19 (not shown) throughout optical network 22 in order to deliver optical transmissions.

Figure 5:
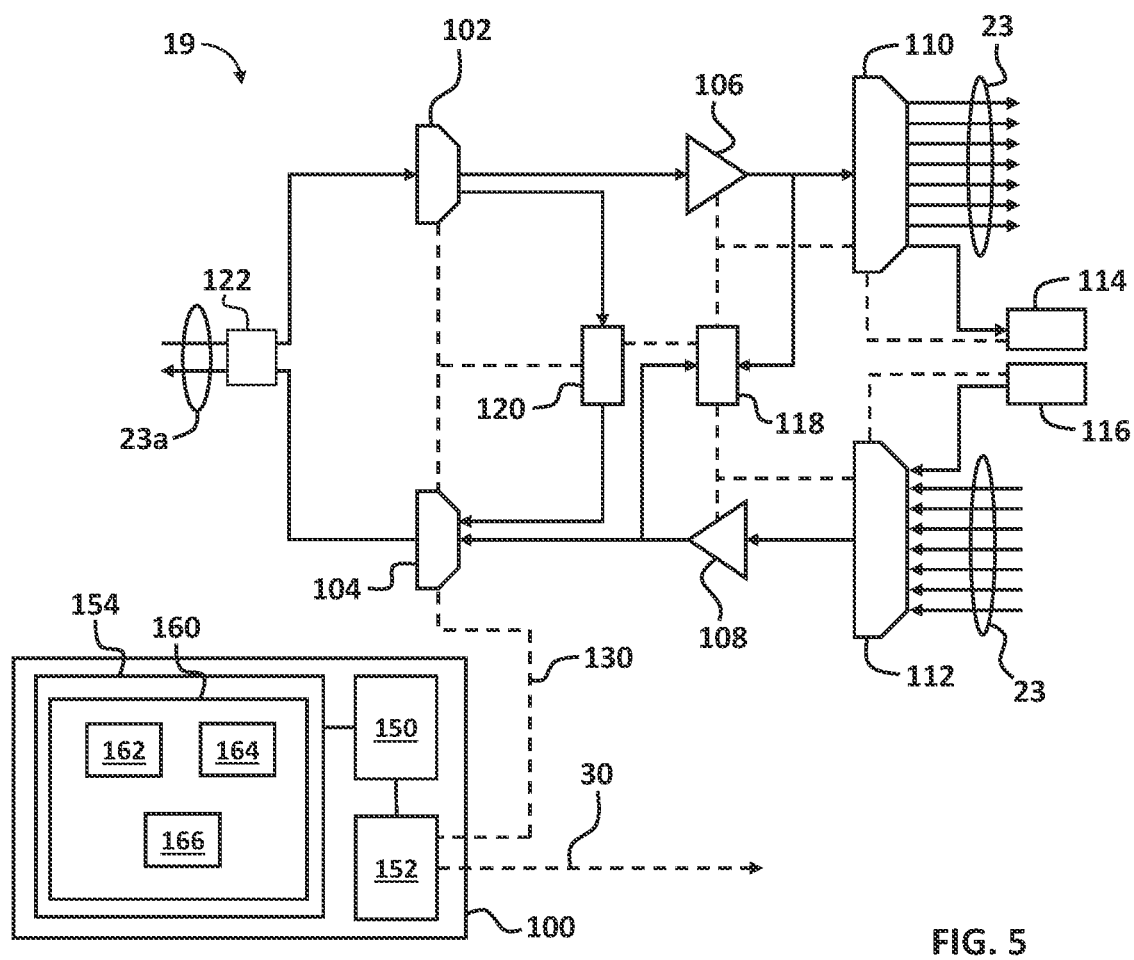
FIG. 5 is a diagrammatic view of an exemplary embodiment of an optical node for use in the loading management system designed to dynamically, create, install, and activate loading policies that may be used to configure spectral loading in the optical network constructed in accordance with one embodiment of the present disclosure.

Referring now to FIG. 5, shown therein is a diagrammatic view of an exemplary optical node 19 of optical network 22 that may be monitored and/or configured according to implementations described herein. The optical nodes 19a and 19b may be constructed similarly as the optical node 19, described below. In accordance with the present disclosure, the optical node 19 may be a ROADM within the fiber of the optical network 22, that allows dynamic, software-driven loading changes to a spectral loading pattern from a remote management system such as the loading management module 92 on the network administration device 16.

The optical node 19 may be provided with a controller 100, an input filter 102, an output filter 104, an input amplifier 106, an output amplifier 108, an output WSS 110, an input WSS 112, at least one add transceiver 114, at least one drop transceiver 116, an optical channel monitor (OCM) 118, and an optical supervisory channel (OSC) 120. It should be noted that the elements of optical node 19 are shown for illustration purposes only and should not be considered limiting. For instance, the illustrated optical node 19 is one possible realization of a single degree of a ROADM. However, the optical node 19 may be implemented as a multi-degree ROADM with a launch power for each transmission line segment 23 serviced by the optical node 19 implemented in accordance with the inventive concepts described herein. Further, the at least one add transceiver 114 and the at least one drop receiver 116 may be implemented as a line card having multiple add and drop transceivers and may be configured to service channels across multiple ROADM degrees.

The OCM 118 provides the ability to monitor a power level of each wavelength. This information can then be used by the controller 100 to attenuate each wavelength with the output WSS 110 and/or the input WSS 112 at ROADM sites or dynamic gain equalization (DGE) at optical amplifier 20 sites in order to optimize the power level of each wavelength. OCM 118 can also be used to troubleshoot the optical network 22. Recent innovations include flexible-grid OCMs and higher-resolution coherent OCMs. Coherent OCMs offer sub-GHz accuracy and highly accurate power monitoring of fine spectral slices independent of adjacent channel power. Coherent OCMs reduce the C-band scanning time from seconds to hundreds of milliseconds. And coherent OCMs provide advanced processing of spectral characteristics, such as valid channel detection, center wavelength, and optical signal-to-noise ratio (OSNR).

The OSC 120 provides a communication channel between adjacent nodes such as optical nodes 19a and 19b that can be used for functions including link control, in-band management, control plane (i.e., ASON/GMPLS), and span loss measurement. Information about the physical properties of the transmission line segment 23 (fiber types, loss, amplifier types, etc.) downstream from the optical node 19 can be communicated to the controller 100 via the OSC 120.

The optical node 19 is illustrated with the controller 100 for controlling the elements of the optical node 19. The optical node 19 may be provided with an interface 130 that connects the controller 100 to the elements of the optical node 19.

The controller 100 may be a microcontroller, for instance, that is provided with a processor 150, a communication device 152, and non-transitory computer readable memory 154 ("memory 154"). The memory 154 may store loading management module 160 that may be used to dynamically edit, install, and/or activate loading policies that may be used to configure spectral loading in the transmission line segment 23 of the optical network 22 and to perform tasks as will be described in further detail herein.

The loading management module 160 may be provided with a policy loader module 162, an activated policy module 164, and a spectrum loading module 166.

The policy loader module 162, activated policy module 164, and the spectrum loading module 166 are configured and operate substantially the same as the policy loader module 93, the activated policy module 94, and the spectrum loading module 95 described above. The description of the policy loader module 93, activated policy module 94, and the spectrum loading module 95 are hereby incorporated by reference and, in the interest of brevity, the policy loader module 162, activated policy module 164, and the spectrum loading module 166 will not be described in further detail.

In some embodiments, the controller 100 may not be provided with the loading management module 160 but instead be provided with a set of processor executable instructions (not shown) that cause the processor 150 to receive a signal including a loading response (e.g., a set of passbands to be loaded and an order in which the passbands are to be loaded, for instance) from the loading management module 92 of the network administration device 16 and load the set of passbands to change the spectral loading pattern.

The number of devices illustrated in FIG. 5 are provided for explanatory purposes. In practice, there may be additional devices, fewer devices, different devices, or differently arranged devices than are shown in FIG. 5. Furthermore, two or more of the devices illustrated in FIG. 5 may be implemented within a single device, or a single device illustrated in FIG. 5 may be implemented as multiple, distributed devices. Additionally, one or more of the devices illustrated in FIG. 5 may perform one or more functions described as being performed by another one or more of the devices illustrated in FIG. 5. Devices illustrated in FIG. 5 may interconnect via wired connections (e.g., fiber-optic connections).

Figure 6:
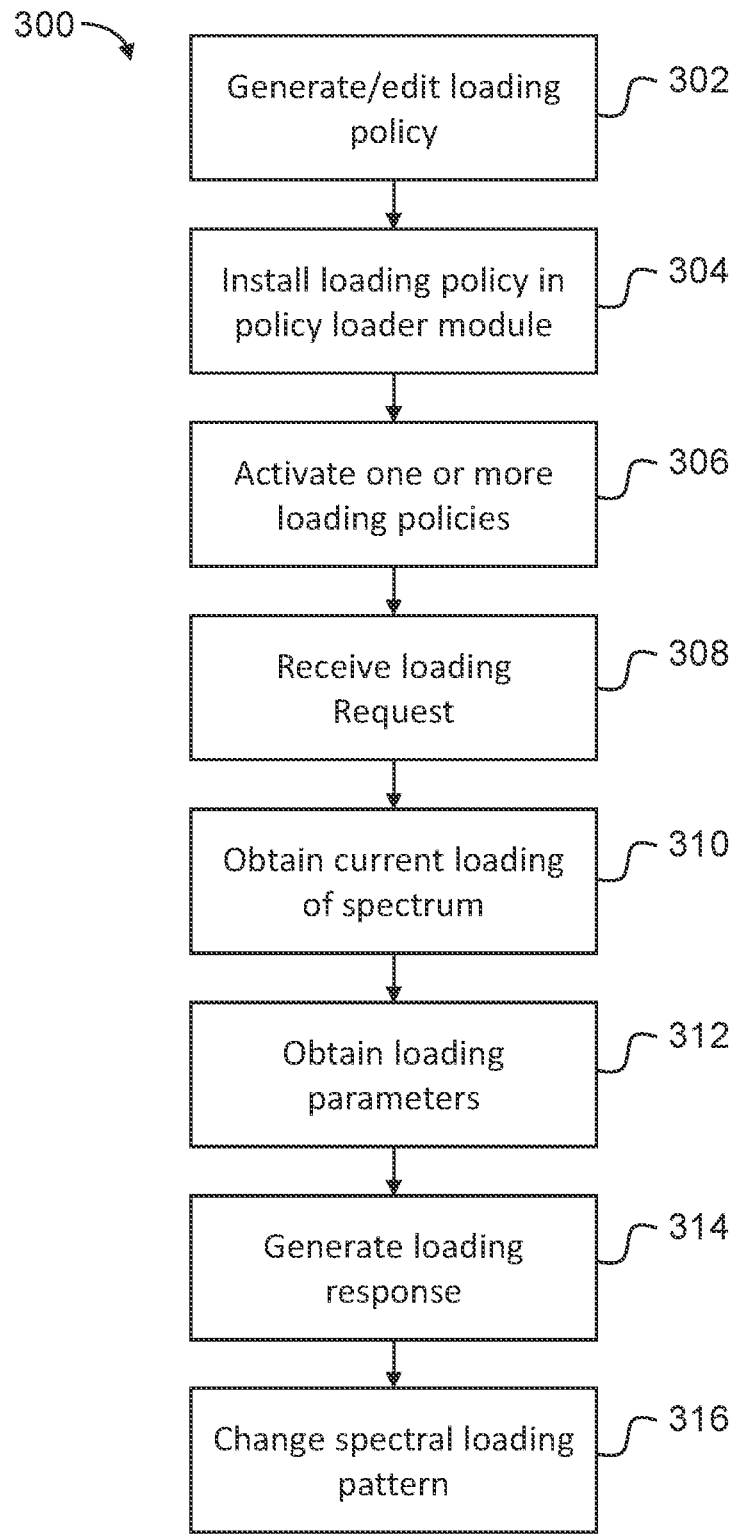
FIG. 6 is a workflow diagram of an exemplary method for generating a loading response to a loading request using the loading management system of FIG. 1 in accordance with one embodiment of the present disclosure.

Referring now to FIG. 6, shown therein is an exemplary workflow diagram 300 for generating a loading response that may be used to change a spectral loading pattern of a transmission line segment in response to a loading request using the system 10. For the purposes of illustration, the workflow diagram 300 will be described using an embodiment of the system 10 with the loading management module 92 operating on the network administration device 16. However, it should be noted that the workflow described would operate substantially the same in an embodiment of the system 10 with the loading module 160 operating on the optical node 19*a* and/or 19*b*.

In step 302, a new loading policy may be generated. As explained above, the new loading policy may be generated from scratch from user input or an existing loading policy may be edited and saved as the new loading policy.

In step 304, the new loading policy may be installed (that is to say saved or stored) in the policy loader module 93. In one exemplary operation of the system 10, the new loading policy may be generated by the user 12 using the GUI 18 on the user device 14 and installed in the policy loader module 93 of the network administration device 16. In another exemplary operation of the system 10, the new loading policy may be generated on the network administration device 16 and installed in the policy loader module 93.

In step 306, the user 12 may activate one or more loading policies installed in the policy loader module 93. In one exemplary operation of the system 10, the user 12 may use the GUI 18 to review loading policies installed in the policy loader module 93 and select one or more of the installed loading policies to activate, for example. In such an embodiment, the GUI 18 may be provided with one or more buttons or other selectable elements configured to accept input from the user 12 indicating selection of the one or more loading policies and input indicating a desire to activate the one or more loading policies. Upon input from the user 12, the GUI 18 may be programmed to cause the user device 14 to send a signal to the loading management module 92 that causes the loading management module 92 to move the one or more loading policies from the policy loader module 93 to the activated policy module 94.

In step 308, the system 10 receives a loading request for the transmission line segment 23 from the user 12. For instance, the user 12 may input the loading request using the GUI 18 on the user device 14. Exemplary loading requests may include a number of channels to be brought up or down on a transmission line segment such as transmission line segment 23, a band to activate or deactivate, for instance. Once the loading request is input by the user 12, the GUI 18 may be programmed to cause the processor 54 to send a signal containing the loading request to the loading management module 92 on the network administration device 16.

In step 310, upon receipt of the loading request, the loading management module 92 may be programmed to cause the processor 88 to obtain current loading data of the transmission line segment 23 from the spectrum loading module 95.

In step 312, upon receipt of the loading request, the loading management module 92 may be programmed to cause the processor 88 to obtain loading parameters from the activated policy module 94.

It should be noted that it is not necessary to perform steps 310 and 312 in order. In some embodiments, step 312 may be performed before step 310. In other embodiments, steps 310 and 312 may be performed substantially simultaneously.

In step 314, the loading management module 92 may be configured to use the loading parameters obtained from the activated policy module 94 and the current loading data of the transmission line segment 23 obtained from the spectrum loading module 95 to generate a loading response.

In step 316, the loading management module 92 may be configured to send a signal containing the loading response to one or both of the optical node 19*a* or 19*b*, the signal configured to cause the optical nodes 19*a* and 19*b* to change a spectral loading pattern of the transmission line segment 23 based on the loading response.

CONCLUSION

Conventionally, loading parameters for a transmission line segment are pre-programmed in system software or available in a presentation layer of the system software. Changes to the pre-programmed loading parameters requires a new release of the system software. When reviewed using the presentation layer of the system software, there are an inordinate amount of loading parameters that can create confusion and may result in user-caused error if the wrong loading parameter is changed. In accordance with the present disclosure, systems and methods are described that allow a user to dynamically create, edit, install, and activate loading policies that may be used to configure spectral loading in a transmission line segment, preferably without requiring an update of the software running on the optical node 19a or 19b, the loading management module 16, the network administration device 16 or the user device 14.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system, comprising:
a network element having a processor and a non-transitory computer readable memory storing instructions that, when executed by the processor, cause the network element to:
obtain and store at least one loading policy for a transmission line segment that is currently operating, the at least one loading policy comprising a combination of loading parameters for one or more types of loading management operations associated with the transmission line segment;
activate at least one of the at least one loading policy;
receive a loading request to change a spectral loading pattern of the transmission line segment;
obtain current loading data of the transmission line segment;
obtain loading parameters from the at least one of the at least one loading policy that was activated;
generate a loading response based at least in part on the current loading data and the loading parameters from the at least one of the at least one loading policy that was activated; and send a signal containing the loading response, the signal configured to change the spectral loading pattern of the transmission line segment based on the loading response.

2. The system of claim 1, wherein the loading parameters comprise one of more of a region in an optical spectrum where the spectral loading pattern of the transmission line segment is to be changed, a maximum power change allowed due to loading; a loading factor for a given range of current loading; an allowable loading limit for a given range of current loading;
whether to consider loading criteria; topology of the transmission line segment; and load balancing.

3. The system of claim 1, wherein the one of more types of loading management operations comprise service activation, service deactivation, band activation, band deactivation, segment activation, and segment deactivation.

4. The system of claim 1, wherein the at least one loading policy for the transmission line segment is generated using a user device.

5. The system of claim 4, wherein the at least one loading policy for the transmission line segment is obtained from the user device, the user device connected to the network element via a network.

6. The system of claim 5, wherein a first signal containing a command to activate the at least one of the at least one loading policy was sent from the user device to the network element via the network, the signal causing the network element to activate the at least one of the at least one loading policy.

7. The system of claim 6, wherein a second signal containing the loading request to change the spectral loading pattern of the transmission line segment was sent from the user device to the network element via the network.

8. An optical receiver in accordance with claim 6, wherein the semiconductor alloy includes AlGaInAs.

9. The system of claim 1, wherein the current loading data of the transmission line segment includes characteristics of the transmission line segment including at least one of a type of amplifier, a fiber type, offsets that are being configured, and number of spans.

10. The system of claim 1, wherein the network element is a network administration device and the signal containing the loading response is sent to an optical node of the transmission line segment, the signal configured to cause the optical node to change the spectral loading pattern of the optical network segment based on the loading response.

11. A method for configuring a spectral loading pattern, comprising:
obtaining at least one loading policy for a transmission line segment that is currently operating, the at least one loading policy comprising a combination of loading parameters for one or more types of loading management operations associated with the transmission line segment;
activating, at a network element of the transmission line segment, at least one of the at least one loading policy;
receiving a loading request to change a spectral loading pattern of the transmission line segment;
obtaining current loading data of the transmission line segment;
obtaining loading parameters from the at least one of the at least one loading policy that was activated;
generating a loading response based at least in part on the current loading data and the loading parameters from the at least one of the at least one loading policy that was activated; and
sending a signal containing the loading response to the network element of the transmission line segment, the signal configured to cause the network element to change the spectral loading pattern of the transmission line segment based on the loading response.

12. The method of claim 11, wherein the loading parameters comprise one or more of a region in an optical spectrum where the spectral loading pattern of the transmission line segment is to be changed; a maximum power change allowed due to loading; a loading factor for a given range of current loading; an allowable loading limit for a given range of current loading; whether to consider loading criteria; topology of the transmission line segment; and load balancing.

13. The method of claim 11, wherein the one or more types of loading management operations comprise service activation, service deactivation, band activation, band deactivation, segment activation, and segment deactivation.

14. The method of claim 11, wherein the at least one loading policy for the transmission line segment is generated using a user device.

15. The method of claim 14, wherein the at least one loading policy for the transmission line segment is obtained from the user device, the user device connected to the network element via a network.

16. The method of claim 15, wherein a first signal containing a command to activate the at least one of the at least one loading policy was sent from the user device to the network element via the network, the signal causing the network element to activate the at least one of the at least one loading policy.

17. The method of claim 16, wherein a second signal containing the loading request to change the spectral loading pattern of the transmission line segment was sent from the user device to the network element via the network.

18. The method of claim 11, wherein the current loading data of the transmission line segment includes characteristics of the transmission line segment including at least one of a type of amplifier, a fiber type, offsets that are being configured, and number of spans.

19. The method of claim 11, wherein the network element is an optical node.

20. The method of claim 11, wherein the network element is a network administration device and the signal containing the loading response is sent to an optical node of the transmission line segment, the signal configured to cause the optical node to change the spectral loading pattern of the optical network segment based on the loading response.

* * * * *